United States Patent
Atake

(10) Patent No.: US 9,302,549 B2
(45) Date of Patent: Apr. 5, 2016

(54) HEAVY DUTY PNEUMATIC TIRE

(71) Applicant: SUMITOMO RUBBER INDUSTRIES, LTD., Kobe-shi, Hyogo (JP)

(72) Inventor: Ikuo Atake, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 661 days.

(21) Appl. No.: 13/689,021

(22) Filed: Nov. 29, 2012

(65) Prior Publication Data
US 2013/0160909 A1   Jun. 27, 2013

(30) Foreign Application Priority Data
Dec. 26, 2011 (JP) ................................. 2011-283878

(51) Int. Cl.
| | |
|---|---|
| *B60C 11/11* | (2006.01) |
| *B60C 11/12* | (2006.01) |
| *B60C 11/03* | (2006.01) |
| *B60C 11/13* | (2006.01) |
| *B60C 13/00* | (2006.01) |

(52) U.S. Cl.
CPC ......... *B60C 11/0311* (2013.04); *B60C 11/0309* (2013.04); *B60C 11/125* (2013.04); *B60C 11/1384* (2013.04); *B60C 13/00* (2013.01); *B60C 11/0306* (2013.04); *B60C 2011/0346* (2013.04); *B60C 2011/0358* (2013.04); *B60C 2011/0367* (2013.04); *B60C 2011/0372* (2013.04); *B60C 2011/0381* (2013.04)

(58) Field of Classification Search
CPC ............ B60C 11/0306; B60C 11/0309; B60C 11/0311; B60C 11/0316; B60C 11/04; B60C 2011/0381; B60C 2011/0383
See application file for complete search history.

(56) References Cited

U.S. PATENT DOCUMENTS

| | | | | |
|---|---|---|---|---|
| 4,362,201 | A | * | 12/1982 | Zinnen et al. ............ 152/209.22 |
| 4,387,754 | A | * | 6/1983 | Mirtain et al. ............. 152/209.1 |
| 2003/0094227 | A1 | * | 5/2003 | Bettiol et al. ............ 152/209.18 |
| 2006/0254684 | A1 | | 11/2006 | Tamura |

FOREIGN PATENT DOCUMENTS

| | | | |
|---|---|---|---|
| JP | 03-125606 | * | 5/1991 |
| JP | 06-166302 | * | 6/1994 |
| JP | 2000-225813 | * | 8/2000 |

OTHER PUBLICATIONS

English machine translation of JP06-166302, dated Jun. 1994.*
English machine translation of JP2000-225813, dated Aug. 2000.*

* cited by examiner

*Primary Examiner* — Steven D Maki
*Assistant Examiner* — Robert Dye
(74) *Attorney, Agent, or Firm* — Birch, Stewart, Kolasch & Birch, LLP

(57) ABSTRACT

A heavy duty pneumatic tire comprises a tread portion provided with a crown main groove and a middle axial groove. The middle axial groove extends axially outwardly from its axially inner end axially outwardly spaced apart from the crown main groove and inclines with respect to the tire circumferential direction at an angle of from 45 to 75 degrees. In a cross section along the widthwise center line of the middle axial groove, an end wall of the axially inner end is inclined at an angle 0 to 50 degrees with respect to the normal direction to the tread from the radially outer edge of the end wall toward the groove bottom, and a corner between the end wall and the groove bottom is chamfered by an arc having a radius of curvature of 1 to 10 mm.

6 Claims, 8 Drawing Sheets

HEAVY DUTY PNEUMATIC TIRE

BACKGROUND OF THE INVENTION

The present invention relates to a pneumatic tire, more particularly to a tread pattern of a heavy duty pneumatic tire capable of improving noise performance without sacrificing drainage performance.

Japanese Patent Application Publication JP-2006-315579A discloses a heavy duty pneumatic tire which is provided in the tread portion with a circumferentially continuously extending crown main groove and middle axial grooves extending axially outwardly from the crown main groove.

In such a tire, since the air in the crown main groove is compressed when entered in the ground contacting ground contacting patch and flows into the middle axial grooves, tire noise so called pumping sound is generated.

SUMMARY OF THE INVENTION

It is therefore, an object of the present invention to provide a heavy duty pneumatic tire in which the noise performance is improved without sacrificing the drainage performance.

According to the present invention, a heavy duty pneumatic tire comprises a tread portion provided with a crown main groove extending continuously in the tire circumferential direction and a middle axial groove, the middle axial groove extending axially outwardly from its axially inner end axially outwardly spaced apart from the crown main groove and inclining with respect to the tire circumferential direction at an angle of from 45 to 75 degrees, the shortest distance between the axially inner end of the middle axial groove and the crown main groove is 1.3 to 2.5% of the tread width, wherein in a cross section along the widthwise center line of the middle axial groove, an end wall of the axially inner end is inclined at an angle 0 to 50 degrees with respect to the normal direction to the tread from the radially outer edge of the end wall toward the groove bottom, and a corner between the end wall and the groove bottom is chamfered by an arc having a radius of curvature of 1 to 10 mm, and the middle axial groove has a depth of 20 to 80% of the depth of the crown main groove.

The heavy duty pneumatic tire according to the present invention may be provided with the following features:

the axially inner end of the middle axial groove has, in its top view, a circumferentially extending central part and a rounded part on each side of the central part in the tire circumferential direction;

the rounded part has a radius of curvature which is not less than 0.5 mm and not more than 50% of the width of the middle axial groove;

the tread portion is provided with a middle connecting sipe connecting between the middle axial groove and the crown main groove;

the depth of the middle connecting sipe is less than the depth of the crown main groove and more than the depth of the middle axial groove, and the width of the middle connecting sipe is not more than 0.33 times the width of the middle axial groove; and the bottom of the middle axial groove is provided with a middle sipe extending along the widthwise center line of the middle axial groove, and the middle sipe is connected to the middle connecting sipe;

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used. The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various cold Inflation Pressures" table in TRA or the like. The standard load is the "maximum load capacity" in JATMA, the "Load Capacity" in ETRTO, the maximum value given in the above-mentioned table in TRA or the like.

The tread edges 2t are the axial outermost edges of the ground contacting patch (camber angle=0) in the normally inflated loaded condition.

The tread width TW is the axial distance between the tread edges measured in the normally inflated unloaded condition of the tire.

DESCRIPTION OF THE PREFERRED EMBODIMENTS

Embodiments of the present invention will now be described in detail in conjunction with the accompanying drawings.

The heavy duty pneumatic tire in this embodiment is a truck/bus tire.

A part of the tread portion 2 centered on tire equator C and having a width of from 25 to 35% of the tread width TW is called "tread crown Cr". A part of the tread portion 2 on each side of the tread crown Cr is called "tread shoulder Sh".

The tread portion 2 is provided with a plurality of circumferentially continuously extending main grooves including a crown main groove 3A disposed in the tread crown Cr, and a shoulder main groove 3B disposed in each tread shoulder Sh.

In this embodiment, the crown main groove 3A is disposed on each side of the tire equator c. Therefore, the tread portion 2 is divided into a crown land portion 4A between the two crown main grooves 3A, a pair of middle land portions 4B each between one of the crown main grooves 3A and the adjacent shoulder main groove 3B, and a pair of shoulder land portions 4C each between one of the tread edges 2t and the adjacent shoulder main groove 3B.

Figure 1:
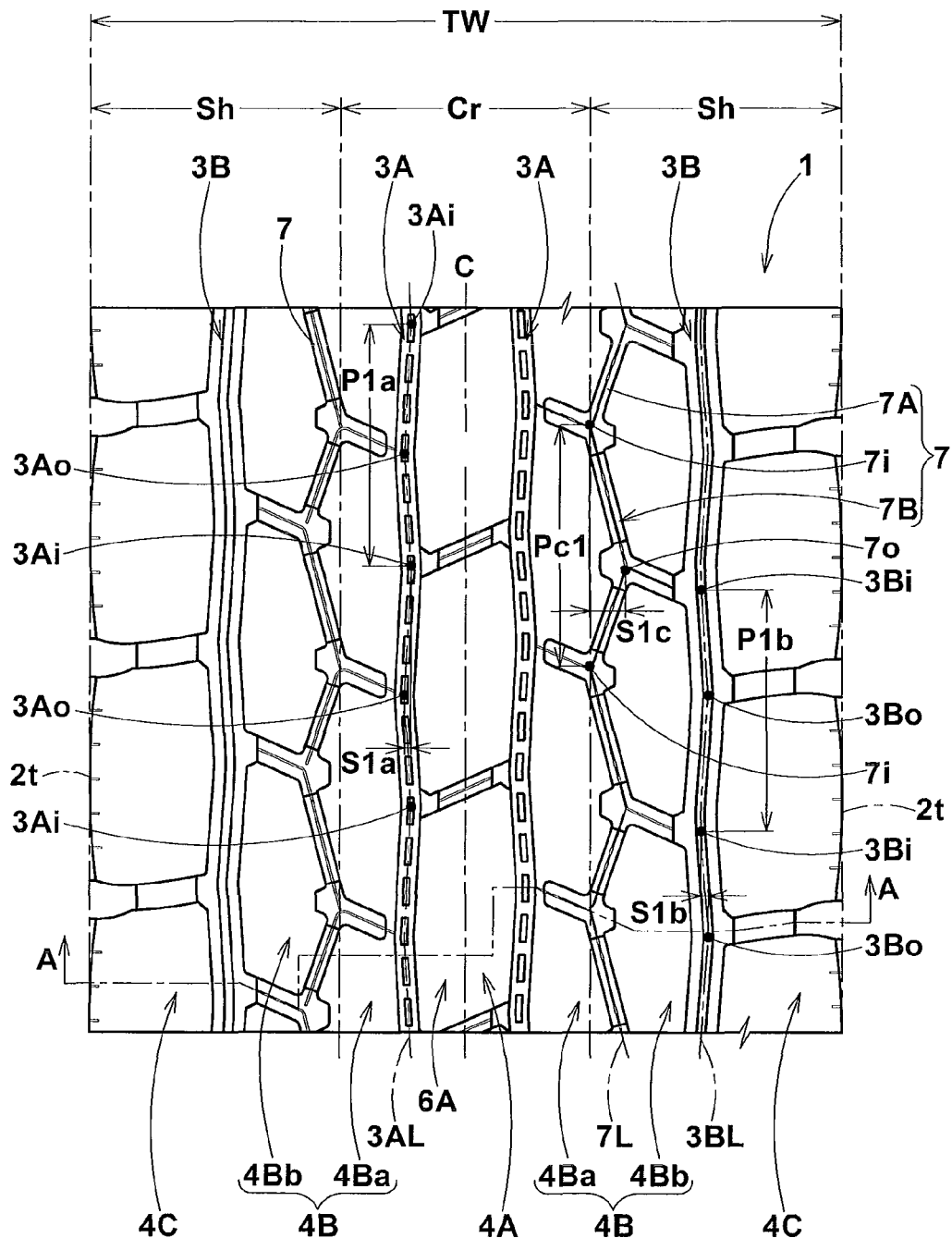
FIG. 1 is a developed partial plan view of a heavy duty pneumatic tire as an embodiment of the present invention showing a tread pattern.
Figure 3:
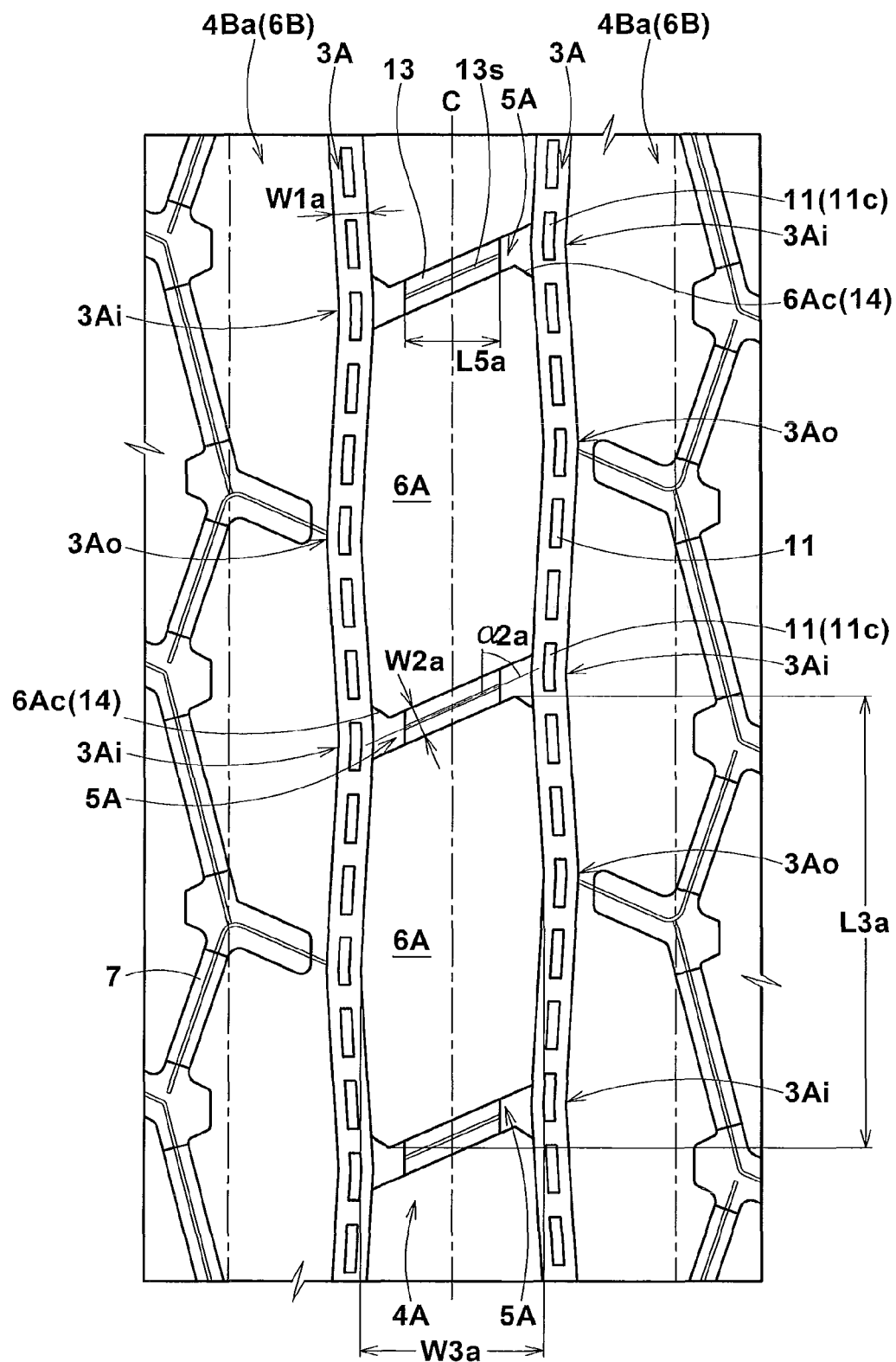
FIG. 3 is an enlarged partial plan view of the tire showing a crown land portion thereof.

As shown in FIG. 1 and FIG. 3, the crown main groove 3A is a zigzag groove with a small zigzag amplitude and has axially inward peaks 3Ai and axially outward peaks 3Ao alternately. The crown main grooves 3A are circumferentially sifted form each other by about 20 to 25% of a zigzag pitch.

Preferably, the crown main groove 3A has a width W1a of about 2 to 4% of the tread width TW, and a depth D1a of about 5 to 8% of the tread width TW.

Preferably, the circumferential zigzag pitch P1a between the axially inward peaks 3Ai is about 25 to 35% of the tread width TW, and
the zigzag width S1a which is the zigzag extent of the groove in the tire axial direction measured between the axially inner most end point of the groove at the axially inward peak 3Ai and the axially outermost end point of the groove at the axially outward peak 3Ao is about 1 to 3% of the tread width TW.

By the crown main groove 3A, the water existing between the tread portion 2 and the road surface can be smoothly led in the tire circumferential direction. The circumferential edges of the crown main groove 3A exert edge effect. The drainage and traction performance can be improved.

Figure 2:
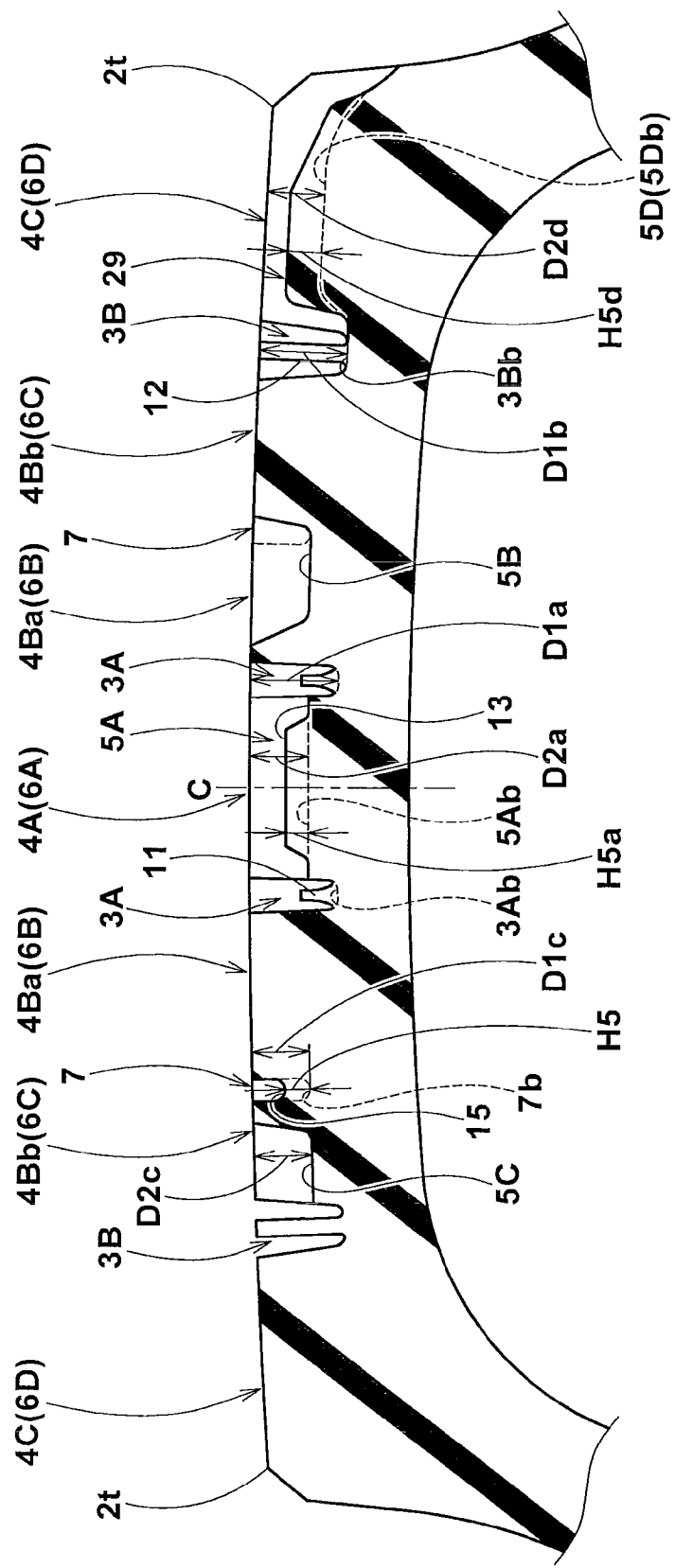
FIG. 2 is a cross sectional view of the tread portion thereof taken along line A-A of FIG. 1.

In this embodiment, as shown in FIG. 2 and FIG. 3, the crown main groove 3A is provided along the widthwise center line 3AL thereof with a plurality of platforms 11 at intervals in order to prevent stone entrapment.

The platform 11 has a rectangular shape in its top view.

The platform 11 protrudes from the groove bottom 3Ab independently.

In this embodiment, the platforms 11 include a bent platform 11c along the axially inward peak 3Ai and a bent platform 11c along the axially outward peak 3Ao because stone entrapment is liable occur in such bent portions.

Figure 4:
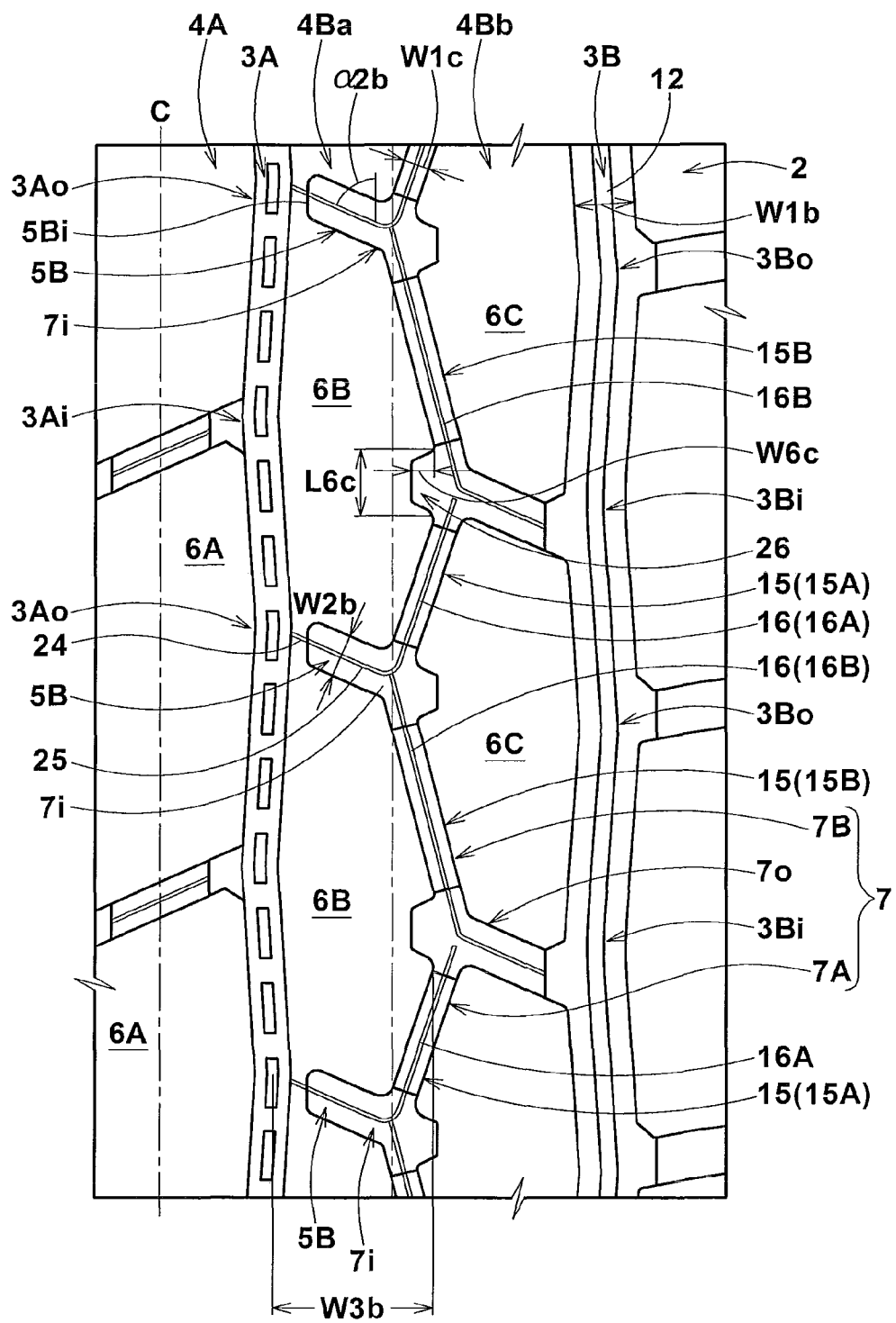
FIG. 4 is an enlarged partial plan view of the tire showing an inner middle land portion thereof.

The shoulder main groove 3B is, as shown in FIG. 1 and FIG. 4, a zigzag groove with a small zigzag amplitude and has axially inward peaks 3Bi and axially outward peaks 3Bo alternately. Preferably, the shoulder main groove 3B has a width W1b of about 4 to 6% of the tread width TW, a depth D1b of about 5 to 8% of the tread width TW, a zigzag pitch P1b of about 25 to 35% of the tread width TW, and a zigzag width S1b of about 1 to 3% of the tread width TW in view of the drainage and traction performance.

The shoulder main groove 3B in this embodiment is provided with a partition wall 12 extending continuously along the widthwise center line 3BL.

The partition wall 12 protrudes from the groove bottom 3Bb up to the groove top, namely, the protruding height is the same as the groove depth D1b.

The partition wall 12 can prevent or reduce the occurrence of air resonance sound.

The crown land portion 4A is, as shown in FIG. 3, provided with crown axial grooves 5A circumferentially arranged at intervals so as to circumferentially divided the crown land portion into circumferentially arranged crown blocks 6A.

The crown axial grooves 5A extend between the axially inward peaks 3Ai of one crown main groove and the axially inward peaks 3Ai of the other crown main groove.

The crown axial grooves 5A incline at an angle $\alpha 2a$ of from 55 to 75 degrees with respect to the tire circumferential direction in order to provide edge effects in the tire circumferential direction and axial direction so as to improve the traction performance and steering stability. The crown axial grooves 5A enhance drainage in the oblique direction.

Preferably, the crown axial groove 5A has a width W2a of from about 2 to 4% of the tread width TW, a depth D2a of from about 5 to 8% of the tread width TW.

The crown axial groove 5A is, as shown in FIG. 2 and FIG. 3, provided with a crown tie bar 13 protruding from the groove bottom 5Ab and connecting the circumferential adjacent crown blocks 6A to increase the circumferential rigidity of the crown land portion 4A and thereby to improve the traction performance.

Preferably, the crown tie bar 13 has an axial length L5a of from about 50 to 80% of the axial width W3a of the crown block 6A, and a protruding height H5a of from about 30 to 50% of the groove depth D2a of the crown axial groove 5A.

The crown tie bar 13 is provided with a crown sipe 13s extending along the widthwise center line 5AL of the crown axial groove 5A to provide appropriate suppleness for the crown tie bar 13 and thereby to prevent damage such as cracks.

The crown block 6A has a circumferentially-long generally-rectangular shape in its top view as shown in FIG. 3 and has a circumferential length L3a more than the axial width W3a. Preferably, the circumferential length L3a is from about 25 to 40% of the tread width TW, and the axial width W3a is from about 8 to 20% of the tread width TW to increase the circumferential rigidity of the crown block 6A and thereby to improve the traction performance.

The crown block 6A is provided with a chamfer 14 at each of acute-angled corners 6Ac formed between the crown main grooves 3A and the crown axial grooves 5A in order to prevent chipping-off of the corners 6Ac and to hinder the air resonance.

The middle land portion 4B is, as shown in FIG. 1 and FIG. 4, provided with a middle auxiliary groove 7 extending continuously in the tire circumferential direction.

Thereby, the middle land portion 4B is subdivided into an inner middle land portion 4Ba between the middle auxiliary groove 7 and the crown main groove 3A and an outer middle land portion 4Bb between the middle auxiliary groove 7 and the shoulder main groove 3B.

The middle auxiliary groove 7 has a width W1c and a depth D1c less than those of the main grooves 3A and 3B.

The middle auxiliary groove 7 in this embodiment is a zigzag groove having axially inward peaks 7i and axially outward peaks 7o alternately, and the zigzag amplitude is more than those of the crown main groove 3A and shoulder main groove 3B.

The middle auxiliary groove 7 is made up of alternate short oblique segments 7A and long oblique segments 7B,
the short oblique segments 7A extending from the axially inward peaks 7i to the axially outward peaks 7o, and
the long oblique segments 7B extending from the axially outward peaks 7o to the axially inward peaks 7i.

The middle auxiliary groove 7 serves to improve the drainage and traction performance.

Preferably, the middle auxiliary groove 7 has a width W1c of from about 1 to 3% of the tread width TW, a depth D1c of from about 3 to 5% of the tread width TW, zigzag pitches P1c of about 25 to 35% of the tread width TW, and a zigzag width S1c of from about 3 to 5% of the tread width TW.

The middle auxiliary groove 7 is provided with middle platforms 15 protruding from the groove bottom 7b and connecting the axially adjacent inner middle land portion 4Ba and outer middle land portion 4Bb.

The middle platforms 15 in this embodiment include a short platform 15A disposed in each of the short oblique segments 7A and a long platform 15B disposed in each of the long oblique segments 7B to increase the axial rigidity of the middle land portion 4B and thereby to improve the cornering performance.

Preferably, the protruding height H5 of the short platforms 15A and long platforms 15B is set in a range of from about 30 to 50% of the depth D1c of the middle auxiliary groove 7.

Further, the bottom 7b of the middle auxiliary groove 7 is provided with middle auxiliary groove sipes 16 extending along the widthwise center line 7L thereof.

The middle auxiliary groove sipes 16 in this embodiment include a short sipe 16A disposed in each of the short oblique segments 7A and a long sipe 16B disposed in each of the long oblique segments 7B. Due to the short sipes 16A and long sipes 16B, when receives the ground pressure, the middle auxiliary groove 7 is allowed to become wider to increase the drainage.

In this embodiment, the short sipes 16A and long sipes 16B are connected with each other in the axially inward peaks 7i of the middle auxiliary groove 7. Thereby, the short sipes 16A and long sipes 16B can increase the drainage during straight running where the ground pressure of the inner middle land portion 4Ba becomes relatively increased.

However, in the axially outward peaks 7o of the middle auxiliary groove 7, the short sipes 16A and long sipes 16B are not connected with each other. Thereby, the rigidity of the outer middle land portion 4Bb which receives a large lateral force during cornering can be maintained to improve the steering stability.

The inner middle land portion 4Ba is provided with inner middle axial grooves 5B.

The inner middle axial grooves 5B extend to the middle auxiliary groove 7 from their axially inner ends 5Bi spaced axially outwardly apart from the crown main groove 3A.

Thereby, the inner middle land portion 4Ba is formed as an inside middle rib 6B extending substantially continuously in the tire circumferential direction.

Each of the inner middle axial grooves 5B extends from one of the axially inward peaks 7i of the middle auxiliary groove 7 to a position near to one of the axially outward peaks 3Ao of the crown main groove 3A, while inclining with respect to the tire circumferential direction at an angle α2b of not less than 45 degrees, preferably not less than 50 degrees, but not more than 75 degrees, preferably not more than 70 degrees. Preferably, the width W2b of the inner middle axial groove 5B is set in a range of from about 2.5 to 4.0% of the tread width TW.

Since the inner middle axial grooves 5B are not connected to the crown main groove 3A, the air compressed in the crown main groove 3A is not allowed to flow into the inner middle axial grooves 5B and the noise performance can be improved. Since the inner middle axial grooves 5B are inclined, water existing between the tread portion 2 and the road surface can be led to the middle auxiliary groove 7 and the drainage can be improved.

If the angle α2b exceeds 75 degrees, then it becomes difficult to improve the drainage. If the angle α2b is less than 45 degrees, it becomes difficult to improve the drainage.

Figure 5:
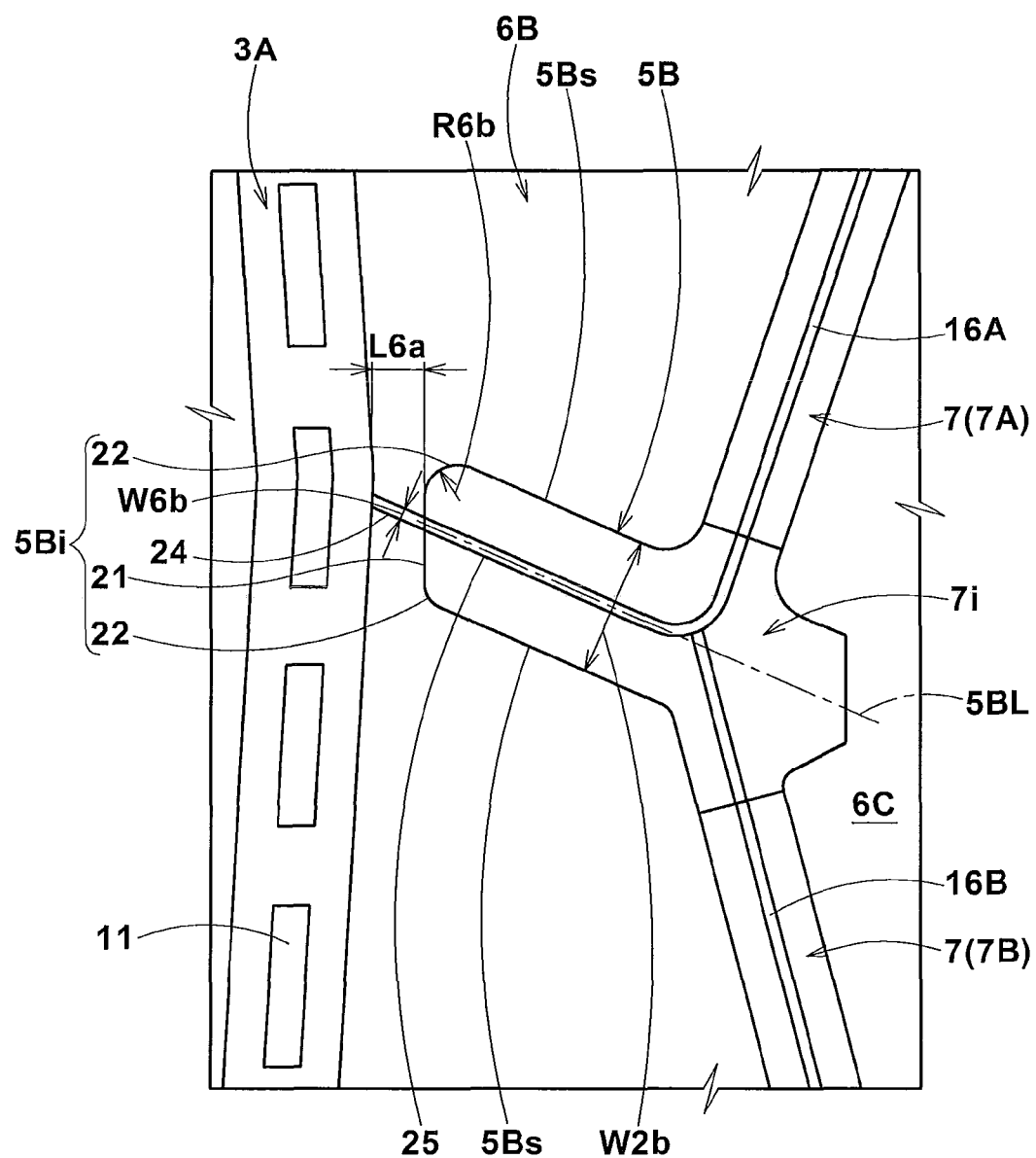
FIG. 5 is an enlarged partial plan view of the tire showing an inner middle axial groove thereof.

In this embodiment, further, as shown in FIG. 5, the shortest distance L6a from the axially inner end 5Bi of the inner middle axial groove 5B to the crown main groove 3A is set in a range of not less than 1.3%, preferably not less than 1.6%, but not more than 2.5%, preferably not more than 2.2% of the tread width TW.

Thus, the axially inner end 5Bi of the inner middle axial groove 5B approaches to the tread crown Cr, and the axial length of the inner middle axial groove 5B is prevented from becoming excessively short, and the drainage can be more effectively improved.

If the ratio L6a/TW exceeds 2.5%, then it is difficult to obtain the above-mentioned advantages. If the ratio L6a/TW becomes less than 1.3%, then there is a possibility that the tread rigidity between the crown main groove 3A and the inner middle axial groove 5B is decreased.

Figure 6:
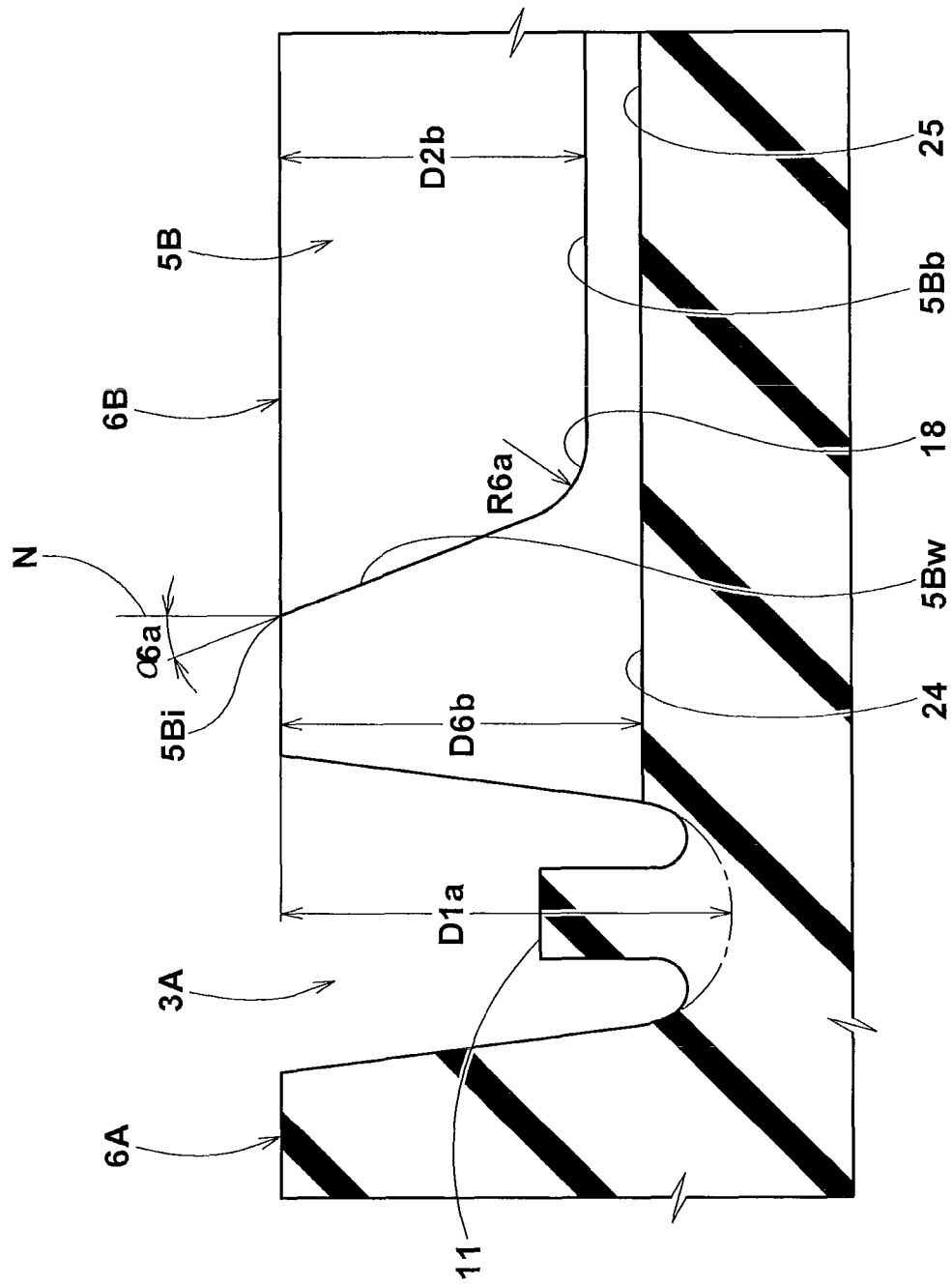
FIG. 6 is a cross sectional view taken along the widthwise center line of the inner middle axial groove.

As shown in FIG. 6, in the cross section along the widthwise center line 5BL of the inner middle axial groove 5B, the inner end wall 5Bw of the inner middle axial groove 5B is (from the radially outer edge towards the groove bottom 5Bb) inclined with respect to the normal line N to the tread at an angle α6a of from 0 to 50 degrees, preferably not less than 15 degrees and not more than 35 degrees.

The depth D2b of the inner middle axial groove 5B is set in a range of not less than 20%, preferably not less than 40%, but not more than 80%, preferably not more than 60% of the depth D1a of the crown main groove 3A.

Thereby, the inner middle axial groove 5B can prevent the decrease in the tread rigidity between the crown main groove 3A and the inner middle axial groove 5B, while maintaining the drainage, and damage such as cracks can be prevented.

If the angle α6a exceeds 50 degrees, then the volume of the inner middle axial groove 5B is decreased, there is a possibility that the drainage can not be improved. If the angle α6a is too small, then the tread rigidity between the crown main groove 3A and the inner middle axial groove 5B can not be sufficiently improved.

If the ratio D2b/D1a becomes less than 20%, then there is a possibility that the volume of the inner middle axial groove 5B becomes insufficient. If the ratio D2b/D1a exceeds 80%, then the tread rigidity between the crown main groove 3A and the inner middle axial groove 5B can not be sufficiently increased.

The corner between the inner end wall 5Bw and the groove bottom 5Bb is rounded by an arc having a radius of curvature R6a of not less than 1 mm, preferably not less than 3 mm, but not more than 10 mm, preferably not more than 8 mm to prevent damage such as cracks.

If the radius of curvature R6a is not more than 1 mm, then it becomes difficult to prevent damage. If the radius of curvature R6a exceeds 10 mm, then there is a possibility that the drainage can not be effectively improved.

It is preferable that, as shown in FIG. 5 in the top view, the axially inner end 5Bi of the inner middle axial groove 5B is provided with a rounded part 22 on each side of the circumferentially extending central part 21 in the tire circumferential direction to prevent damage such as cracks.

Preferably, the radius of curvature R6b of the rounded part 22 is set in a rang of not less than 0.5 mm, more preferably not less than 1.0 mm, and not more than 50%, more preferably not more than 40% of the width W2b of the inner middle axial groove 5B.

If the radius of curvature. R6b becomes less than 0.5 mm, then it becomes difficult to disperse the stress. If the radius of curvature R6b exceeds 50% of the groove width W2b, then there is a possibility that the groove volume excessively decreased.

Preferably, the tread portion 2 is further provided with a middle connecting sipe 24 connecting between the crown main groove 3A and each of the inner middle axial grooves 5B as shown in FIG. 5 and FIG. 6.

The depth D6b of the middle connecting sipe 24 is preferably more than the depth D2b of the inner middle axial groove 5B. More preferably, the ratio D6b/D2b is not less than 1.1, still more preferably not less than 1.2.

Such middle connecting sipe 24 can provide appropriate suppleness for the tread portion 2 between the crown main groove 3A and the inner middle axial groove 5B and prevent stress concentration on this part.

If the depth D6b of the middle connecting sipe 24 is too small, it becomes difficult to provide appropriate suppleness.

If the depth D6b of the middle connecting sipe 24 is too large, the rigidity of the tread portion 2 between the crown main groove 3A and the inner middle axial groove 5B becomes excessively decreased. From this standpoint, the ratio D6b/D1a of the depth D6b of the middle connecting sipe 24 to the depth D1a of the crown main groove 3A is preferably not more than 0.95, more preferably not more than 0.9.

For similar reasons, the ratio W6b/W2b of the width W6b of the middle connecting sipe 24 to the width W2b of the inner middle axial groove 5B is not less than 0.05, preferably not less than 0.1, but not more than 0.33, preferably not more than 0.2.

The bottom 5Bb of the inner middle axial groove 5B in this embodiment is provided with an inside middle sipe 25 extending along the widthwise center line 5BL of the inner middle axial groove 5B.

The inside middle sipe 25 allows to increase the width W2b of the inner middle axial groove 5B when receives the ground pressure and the drainage and durability can be improved.

It is preferable that the axially inner end of the inside middle sipe 25 is connected to the middle connecting sipe 24. Thereby, a crown main groove 3A side of the inner middle axial groove 5B is allowed to become wider and the drainage can be further improved.

On the other hand, the axial outer end of the inside middle sipe 25 is preferably connected to the short sipe 16A and long sipe 16B in the axially inward peak 7i of the middle auxiliary groove 7. By the inside middle sipe 25, together with the short sipe 16A and long sipe 16B, the inner middle axial groove 5B is allowed to become more wider and the drainage can be effectively improved.

As explained above, the inside middle rib 6B is substantially continuous. In other words, there is no groove extending across the entire width between the crown main groove 3A and the middle auxiliary groove 7.

Here, the term "groove" means a channel wide enough to exert drainage, therefore, a sipe is not classified as a groove. Thereby, in comparison with a row of blocks, the inside middle rib 6B is increased in the circumferential rigidity and axial rigidity, and it is possible to improve the straight running stability and cornering stability.

Preferably, the width W3b of the inside middle rib 6B is set in a range of from about 7 to 15% of the tread width TW.

The axial outer edge of the inside middle rib 6B is provided with reentrants 26 toward the axially outside.

The reentrant 26 has a rectangular or trapezoidal shape in its top view to facilitate the drainage toward the middle auxiliary groove 7 from the inside middle rib 6B.

Preferably, the reentrant 26 has a circumferential length L6c of about 40 to 60% of the width W3b of the inside middle rib 6B, and an axial width W6c of about 10 to 20% of the width W3b of the inside middle rib 6B.

Figure 7:
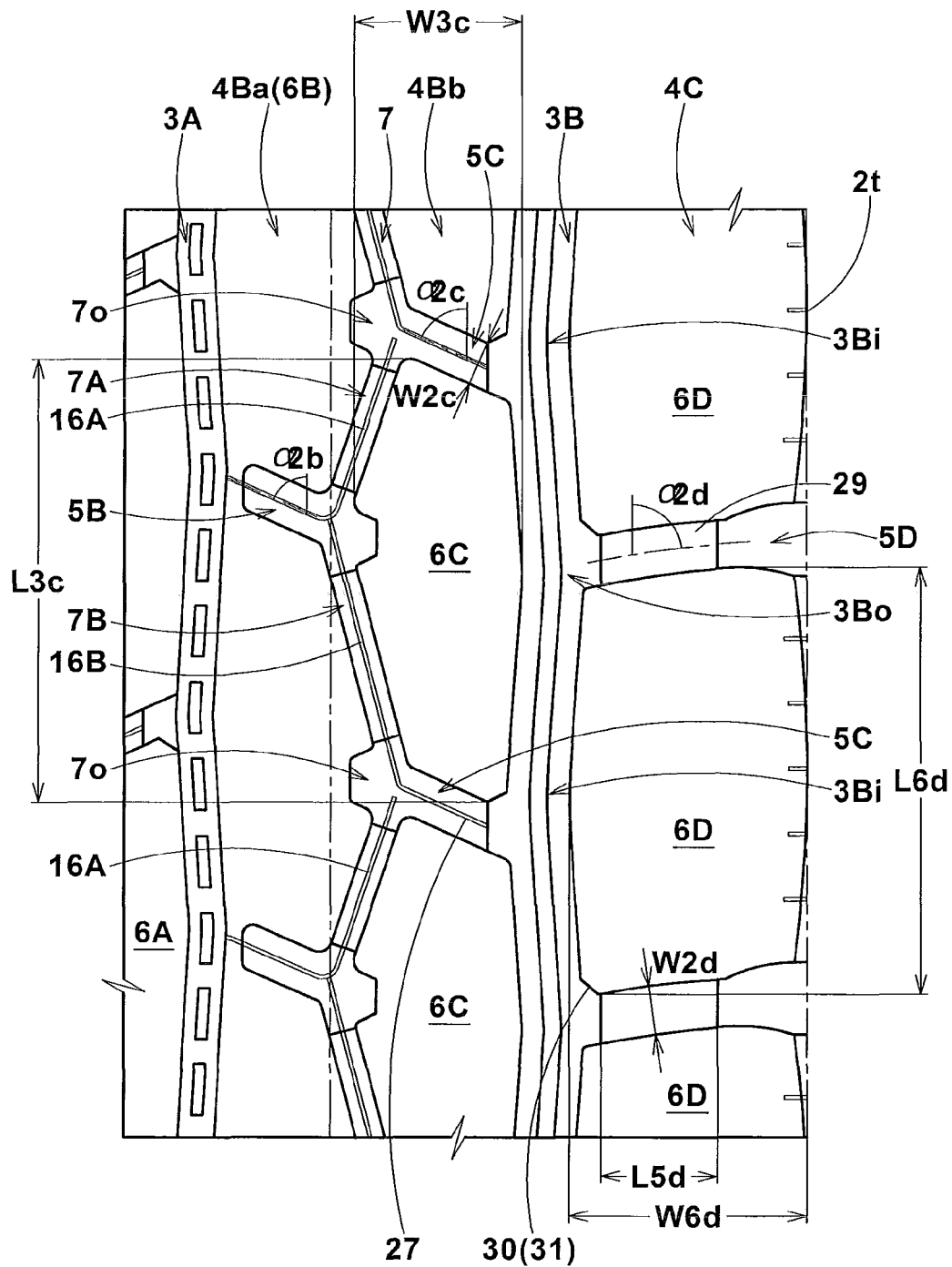
FIG. 7 is an enlarged partial plan view of the tire showing an outer middle land portion and an shoulder land portion.
Figure 8:
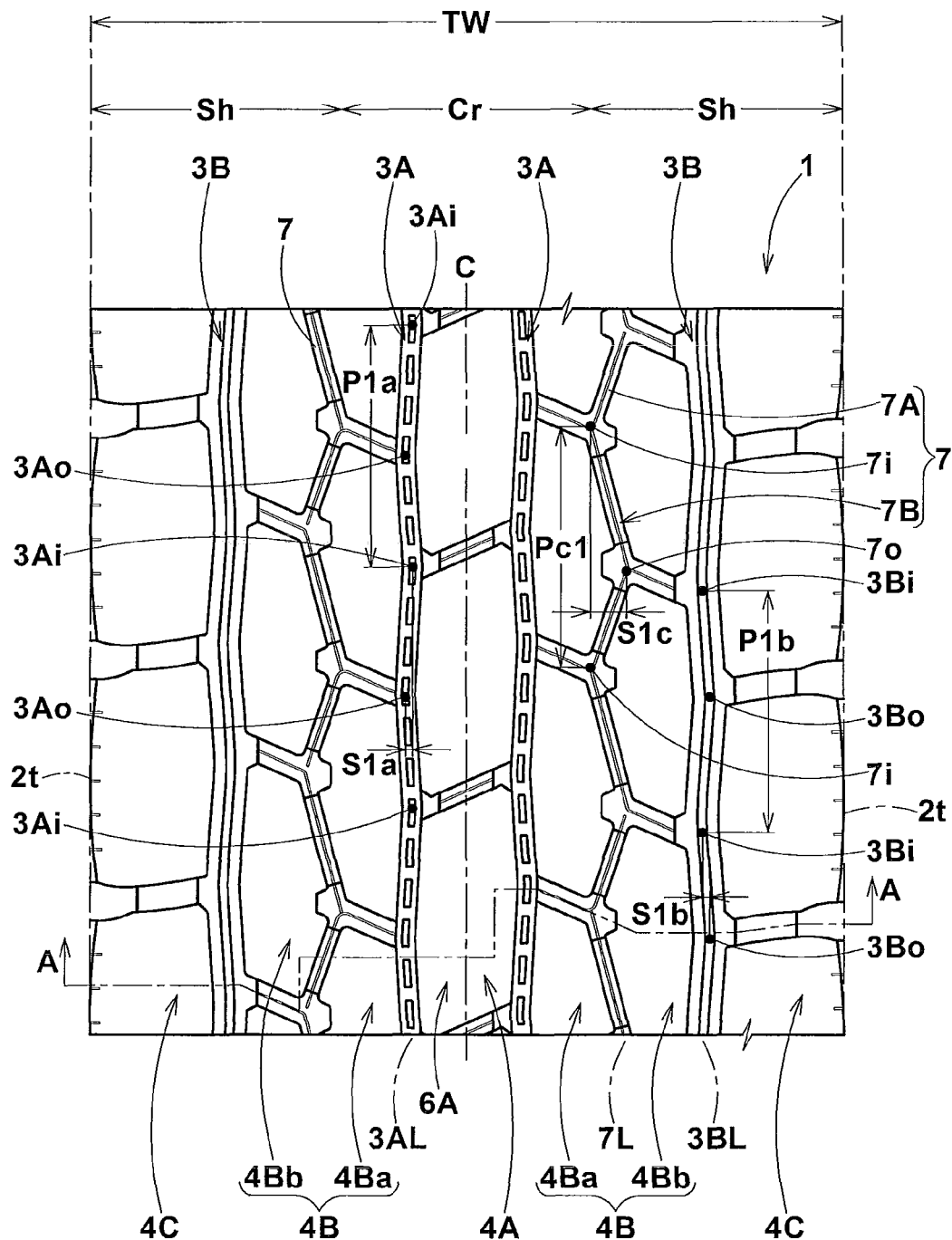
FIG. 8 is a developed partial plan view of a tire used as comparative tire Ref. 1 in the undermentioned comparison test.

The outer middle land portion 4Bb is, as shown in FIG. 7, provided with outside middle axial grooves 5C arranged at intervals in the tire circumferential direction and extending from the middle auxiliary groove 7 to the shoulder main groove 3B. Thereby, the outer middle land portion 4Bb is circumferentially divided into circumferentially arranged outside middle blocks 6C.

The outside middle axial grooves 5C extend from the axially outward peaks 7o of the middle auxiliary groove 7 to the axially inward peaks 3Bi of the shoulder main groove 3B, while inclining with respect to the tire circumferential direction at angle α2c of not less than 45 degrees, preferably not less than 50 degrees, but not more than 75 degrees, preferably not more than 70 degrees. Such outside middle axial grooves 5C can improve the traction performance, steering stability, and drainage.

Preferably, the outside middle axial groove 5C has a width W2c of from about 2.5 to 4.0% of the tread width TW, and a depth D2c of from about 1.5 to 3.5% of the tread width TW.

The bottom of the outside middle axial groove 5C is provided with an outside middle sipe 27 extending along the widthwise center line thereof.

Such outside middle sipe 27 also increase the width W2c of the outside middle axial groove 5C when entered in the ground contacting patch due to the ground pressure, and the drainage and durability can be improved.

Preferably, the axially inner end of the outside middle sipe 27 is connected to the long sipe 16B in the axially outward peak 7o of the middle auxiliary groove 7. Thus, the outside middle sipe 27 can increase the groove width from the long oblique segment 7B of the middle auxiliary groove 7 to the outside middle axial groove 5C and the drainage can be further improved.

The outside middle sipe 27 is not connected to the short sipe 16A. Thus, the rigidity of the outer middle land portion 4Bb is maintained, and the steering stability can be improved.

The outside middle block 6c has a circumferentially long, axially inwardly protruding pentagonal shape in its top view and has an axial width W3c and a circumferential length L3c more than the an axial width W3c.

Preferably, the length L3c is about 25 to 35% of the tread width TW, and the width W3c is about 7 to 15% of the tread width TW. The outside middle block 6c can improve the traction performance and steering stability.

Preferably, the outside middle block 6c is provided at the axially inner end thereof with a reentrant 28 toward the axially outside. The reentrant 28 has a rectangular or trapezoidal shape in its top view.

Preferably, the reentrant 28 is formed in a substantially same size as the reentrant 26 of the inside middle rib 6B.

Such reentrant 28 also prevents damage such as chipping-off and can improve the drainage.

The shoulder land portion 4C is provided with shoulder axial grooves 5D arranged at intervals in the tire circumferential direction and extending between the shoulder main groove 3B and the tread edge 2t.

Thereby, the shoulder land portion 4C is divided into circumferentially arranged shoulder blocks 6D.

The shoulder axial grooves 5D extend from the axially outward peaks 3Bo of the shoulder main groove 3B to the tread edge 2t, while inclining with respect to the tire circumferential direction at angle α2d of from about 70 to 90 degrees.

The shoulder axial grooves 5D can be improve the drainage, traction performance and steering stability.

Preferably, the shoulder axial groove 5D has a width W2d of about 2.5 to 5.5% of the tread width TW, and a depth D2d of about 5 to 8% of the tread width TW.

The bottom 5Db of the shoulder axial groove 5D is provided with a shoulder tie bar 29 protruding from the bottom 5Db to connect the circumferential adjacent shoulder blocks 6D each other. Thereby, the circumferential rigidity of the shoulder land portion 4C can be increased, and the traction performance and cornering performance can be improved. Preferably, the shoulder tie bar 29 has an axial length L5d of about 40 to 60% of the axial width W6d of the shoulder block 6D, and a protruding height H5d of about 60 to 80% of the depth D2d of the shoulder axial groove 5D.

The shoulder block 6D has a circumferential long, generally rectangular shape in its top view, and has an axial width W6d and a circumferential length L6d more than the axial width W6d.

Preferably, the length L6d is about 25 to 35% of the tread width TW, and the width W6d is about 10 to 20% of the tread width TW. Such shoulder block 6D can improve the traction performance and steering stability.

The shoulder block 6D is provided with a chamfer 31 at an acute-angled corner 30 between the shoulder axial groove 5D and the shoulder main groove 3B. Such chamfer 31 also facilitates the improvement in the durability and noise performance.

The shoulder block 6D is provided with shoulder sipes 32 arranged at intervals in the tire circumferential direction and extending from the axially outer edge (or tread edge) toward the axially inside for a short distance. Such shoulder sipe 32 mitigates the rigidity in a tread edge side of the shoulder block 6D and can be improve the wandering performance.

Comparison Tests

Heavy duty radial tires of size 275/80R22.5 (rim size 22.5× 7.5) having specifications shown in Table 1 were prepared and tested.

Common specifications are as follows:
tread width TW: 248 mm
crown main groove:
    width W1a: 6 mm, 2.4% of TW
    depth D1a: 16 mm, 6.5% of TW
    zigzag pitch P1a: 80 mm, 32.3% of TW
    zigzag width S1a: 2 mm, 0.8% of TW
shoulder main groove:
    width W1b: 10 mm, 4.0% of TW
    depth D1b: 16 mm, 6.5% of TW
    zigzag pitch P1b: 80 mm, 32.3% of TW
    zigzag width S1b: 2 mm, 0.8% of TW
crown axial groove:
    angle α2a: 65 degrees
    width W2a: 6 mm, 2.4% of TW
    depth D2a: 10 mm, 4.0% of TW
crown block:
    length L3a: 80 mm, 32.3% of TW
    width W3a: 30 mm, 12.1% of TW
middle auxiliary groove:
    width W1c: 5 mm, 2.0% of TW:
    depth D1c: 10 mm, 4.0% of TW
    zigzag pitch P1c: 80 mm, 32.3% of TW
    zigzag width S1c: 8 mm, 3.2% of TW
short tie bar, long tie bar:
    protruding height H5: 4.5 mm, 45% of D1c
inner middle axial groove:
    width W2b: 8 mm, 3.2% of TW
inside middle rib:
    width W3b: 26 mm, 10.5% of TW
    reentrant length L6c: 12 mm, 46.2% of W3b
    reentrant width W6c: 4 mm, 15.4% of W3b
outside middle axial groove:
    angle α2c: 65 degrees
    width W2c: 8 mm, 3.2% of TW
    depth D2c: 10 mm, 4.0% of TW
outside middle block:
    length L3c: 74 mm, 29.8% of TW
    width W3c: 28 mm, 11.3% of TW
shoulder axial groove:
    angle α2d: 80 degrees
    width W2d: 8 to 10 mm, 3.2 to 4.0% of TW
    depth D2d: 16 mm, 6.5% of TW <Noise Performance Test>

In an anechoic room, by the use of a tire test drum (dia. 1.7 m) around which ISO road surface is provided, the test tire running at a speed of 40 km/h was measured for the noise level dB(A) with a microphone set at a position 1.0 m sideways from the tread edge, and 0.32 m high and 0.2 m rearwards from the rotational center.

The results are indicated by an index based on the comparative tire Ref. 1 being 100, wherein the smaller the index number, the better the pass-by noise.

Tire pressure: 900 kPa (standard pressure)
Tire load: 23.8 kN (70% of Standard load=Max load)<

<Drainage Test>

2-D wheel type test vehicles provided on all of four wheels with test tires (pressure 900 kPa) were run on a wet asphalt road surface in a tire test course, and one hundred drivers evaluated the drainage performance. The results are expressed by the number of drivers who judged the drainage performance of the tire in question was inferior to that of the comparative tire Ref. 1

The results are indicated in Table 1 as follows.

A: the number of drivers was less than 10%

B: the number of drivers was not less than 10% and less than 30%

C: the number of drivers was not less than 30% and less than 50%

X: the number of drivers was not less than 50%

<Crack Resistance Test>

By the use of the tire test drum, the test tire was run for 10000 km at a speed 50 km/h under a tire load 33.83 kN (standard load) and then the tread rubber between the crown main groove and the inner middle axial groove was visually checked for damage such as cracks.

The results are indicated in Table 1 as follows.

A: no crack was found

B: crack having a depth of less than 20% of the depth of the crown main groove was found C: crack having a depth of less than 50% of the depth of the crown main groove was found X: crack having a depth of 50% or more of the depth of the crown main groove was found Form the test results it was confirmed that the noise performance can be improved without sacrificing the drainage performance.

TABLE 1

| Tire | Ref. 1 | Ref. 2 | Ref. 3 | Ref. 4 | Ref. 5 | Ex. 1 | Ex. 2 | Ex. 3 | Ex. 4 | Ex. 5 | Ex. 6 | Ex. 7 |
|---|---|---|---|---|---|---|---|---|---|---|---|---|
| tread pattern (FIG. No.) | 8 | 1 | 1 | 1 | 1 | 1 | 1 | 1 | 1 | 1 | 1 | 1 |
| crown main groove depth D1a (mm) | — | 16.0 | 16.0 | 16.0 | 16.0 | 16.0 | 16.0 | 16.0 | 16.0 | 16.0 | 16.0 | 16.0 |
| inner middle axial groove | | | | | | | | | | | | |
| angle α2b (deg.) | 65 | 65 | 65 | 65 | 65 | 65 | 65 | 45 | 75 | 65 | 65 | 65 |
| distance L6a (mm) | — | 2.48 | 7.44 | 3.72 | 3.72 | 3.72 | 3.72 | 3.72 | 3.72 | 3.22 | 6.20 | 3.72 |
| L6a/TW (%) | — | 1.00 | 3.00 | 1.50 | 1.50 | 1.50 | 1.50 | 1.50 | 1.50 | 1.30 | 2.50 | 1.50 |
| depth D2b (mm) | — | 16.0 | 12.8 | 1.6 | 8.0 | 10.4 | 8.0 | 8.0 | 8.0 | 8.0 | 8.0 | 3.2 |
| D2b/D1a (%) | — | 100.0 | 80.0 | 10.0 | 50.0 | 65.0 | 50.0 | 50.0 | 50.0 | 50.0 | 50.0 | 20.0 |
| inner end wall angle α6a (deg.) | — | 0 | 0 | 0 | 70 | 25 | 25 | 25 | 25 | 25 | 25 | 25 |
| radius R6a (mm) | — | 1.5 | 1.5 | 1.5 | 1.5 | 5.0 | 5.0 | 5.0 | 5.0 | 5.0 | 5.0 | 5.0 |
| radius R6b (mm) | — | 0.2 | 0.2 | 0.2 | 0.2 | 1.0 | 1.0 | 1.0 | 1.0 | 1.0 | 1.0 | 1.0 |
| R6b/W2b | — | 2.5 | 2.5 | 2.5 | 2.5 | 12.5 | 12.5 | 12.5 | 12.5 | 12.5 | 12.5 | 12.5 |
| inside middle sipe | | | | | | | | | | | | |
| middle connecting sipe | — | non | non | non | non | non | | | | | | |
| depth D6b (mm) | — | 15.0 | 12.0 | 14.5 | 12.0 | 14.0 | 14.0 | 14.0 | 14.0 | 14.0 | 14.0 | 14.0 |
| D6b/D1a | — | 0.94 | 0.75 | 0.91 | 0.75 | 0.88 | 0.88 | 0.88 | 0.88 | 0.88 | 0.88 | 0.88 |
| D6b/D2b | — | 0.94 | 0.94 | 9.06 | 1.50 | 1.35 | 1.75 | 1.75 | 1.75 | 1.75 | 1.75 | 4.38 |
| width W6b (mm) | — | 0.6 | 0.6 | 0.6 | 0.6 | 0.6 | 0.6 | 0.6 | 0.6 | 0.6 | 0.6 | 0.6 |
| W6b/W2b | — | 0.08 | 0.08 | 0.08 | 0.08 | 0.08 | 0.08 | 0.08 | 0.08 | 0.08 | 0.08 | 0.08 |
| noise performance | 100 | 96 | 92 | 90 | 92 | 95 | 95 | 95 | 93 | 95 | 94 | 94 |
| drainage | — | B | C | C | C | B | A | B | B | A | B | B |
| crack resistance | — | X | C | B | A | A | A | A | A | B | A | A |

| Tire | Ex. 8 | Ex. 9 | Ex. 10 | Ex. 11 | Ex. 12 | Ex. 13 | Ex. 14 | Ex. 15 | Ex. 16 | Ex. 17 | Ex. 18 | Ex. 19 |
|---|---|---|---|---|---|---|---|---|---|---|---|---|
| tread pattern (FIG. No.) | 1 | 1 | 1 | 1 | 1 | 1 | 1 | 1 | 1 | 1 | 1 | 1 |
| crown main groove depth D1a (mm) | 16.0 | 16.0 | 16.0 | 16.0 | 16.0 | 16.0 | 16.0 | 13.3 | 16.0 | 16.0 | 16.0 | 16.0 |
| inner middle axial groove | | | | | | | | | | | | |
| angle α2b (deg.) | 65 | 65 | 65 | 65 | 65 | 65 | 65 | 65 | 65 | 65 | 65 | 65 |
| distance L6a (mm) | 3.72 | 3.72 | 3.72 | 5.46 | 3.72 | 3.72 | 3.72 | 3.72 | 3.72 | 3.72 | 3.72 | 3.72 |
| L6a/TW (%) | 1.50 | 1.50 | 1.50 | 2.20 | 1.50 | 1.50 | 1.50 | 1.50 | 1.50 | 1.50 | 1.50 | 1.50 |
| depth D2b (mm) | 12.8 | 8.0 | 8.0 | 8.0 | 8.0 | 8.0 | 8.0 | 8.0 | 8.0 | 8.0 | 8.0 | 8.0 |
| D2b/D1a (%) | 80.0 | 50.0 | 50.0 | 50.0 | 50.0 | 50.0 | 50.0 | 50.0 | 50.0 | 50.0 | 50.0 | 50.0 |
| inner end wall angle α6a (deg.) | 25 | 50 | 25 | 45 | 25 | 25 | 25 | 25 | 25 | 25 | 5 | 5 |
| radius R6a (mm) | 5.0 | 5.0 | 1.0 | 10.0 | 5.0 | 5.0 | 5.0 | 5.0 | 5.0 | 5.0 | 10.0 | 1.5 |
| radius R6b (mm) | 1.0 | 1.0 | 1.0 | 1.5 | 0.5 | 4.0 | 1.0 | 1.0 | 1.0 | 1.0 | 0.2 | 2.0 |
| R6b/W2b | 12.5 | 12.5 | 12.5 | 18.8 | 6.3 | 50.0 | 12.5 | 12.5 | 12.5 | 12.5 | 2.5 | 25.0 |
| inside middle sipe | | | | | | | | | | non | | |
| middle connecting sipe | | | | | | | | | | | non | non |
| depth D6b (mm) | 14.0 | 14.0 | 14.0 | 14.0 | 14.0 | 14.0 | 7.5 | 14.0 | 14.0 | 14.0 | 14.0 | 14.0 |
| D6b/D1a | 0.88 | 0.88 | 0.88 | 0.88 | 0.88 | 0.88 | 0.47 | 1.05 | 0.88 | 0.88 | 0.88 | 0.88 |
| D6b/D2b | 1.09 | 1.75 | 1.75 | 1.75 | 1.75 | 1.75 | 0.94 | 1.75 | 1.75 | 1.75 | 1.75 | 1.75 |
| width W6b (mm) | 0.6 | 0.6 | 0.6 | 0.6 | 0.6 | 0.6 | 0.6 | 0.6 | 2.6 | 0.6 | 0.6 | 0.6 |
| W6b/W2b | 0.08 | 0.08 | 0.08 | 0.08 | 0.08 | 0.08 | 0.08 | 0.08 | 0.33 | 0.08 | 0.08 | 0.08 |
| noise performance | 96 | 94 | 95 | 92 | 94 | 95 | 93 | 93 | 97 | 94 | 94 | 95 |
| drainage | A | B | B | B | B | B | A | A | A | B | B | B |
| crack resistance | B | A | C | A | C | A | B | B | B | A | B | B |

The invention claimed is:

1. A heavy duty pneumatic tire comprising a tread portion having a tread width,
    the tread portion provided with a crown main groove extending continuously in the tire circumferential direction and a middle axial groove,
    the middle axial groove extending axially outwardly from its axially inner end axially outwardly spaced apart from the crown main groove and inclining with respect to the tire circumferential direction at an angle of from 45 to 75 degrees,
    the shortest distance between the axially inner end of the middle axial groove and the crown main groove being 1.3 to 2.5% of the tread width,
    wherein
    in a cross section along the widthwise center line of the middle axial groove, an end wall of the axially inner end is inclined at an angle 0 to 50 degrees with respect to the normal direction to the tread from the radially outer edge of the end wall toward the groove bottom, a corner between the end wall and the groove bottom is chamfered by an arc having a radius of curvature of 1 to 10 mm, and the middle axial groove has a depth of 20 to 80% of the depth of the crown main groove, and
    wherein
    the tread portion is provided with a middle connecting sipe connecting between the middle axial groove and the crown main groove,
    the depth of the middle connecting sipe is less than the depth of the crown main groove and more than the depth of the middle axial groove, and
    the width of the middle connecting sipe is not more than 0.33 times the width of the middle axial groove.

2. The heavy duty pneumatic tire according to claim 1, wherein the axially inner end of the middle axial groove has, in its top view, a circumferentially extending central part and a rounded part on each side of the central part in the tire circumferential direction.

3. The heavy duty pneumatic tire according to claim 2, wherein the rounded part has a radius of curvature which is not less than 0.5 mm and not more than 50% of the width of the middle axial groove.

4. A heavy duty pneumatic tire comprising a tread portion having a tread width,
- the tread portion provided with a crown main groove extending continuously in the tire circumferential direction and a middle axial groove,
- the middle axial groove extending axially outwardly from its axially inner end axially outwardly spaced apart from the crown main groove and inclining with respect to the tire circumferential direction at an angle of from 45 to 75 degrees,
- the shortest distance between the axially inner end of the middle axial groove and the crown main groove being 1.3 to 2.5% of the tread width, wherein
- in a cross section along the widthwise center line of the middle axial groove, an end wall of the axially inner end is inclined at an angle 0 to 50 degrees with respect to the normal direction to the tread from the radially outer edge of the end wall toward the groove bottom, a corner between the end wall and the groove bottom is chamfered by an arc having a radius of curvature of 1 to 10 mm, and the middle axial groove has a depth of 20 to 80% of the depth of the crown main groove, and wherein
- the tread portion is provided with a middle connecting sipe connecting between the middle axial groove and the crown main groove, and
- the bottom of the middle axial groove is provided with a middle sipe extending along the widthwise center line of the middle axial groove, and
- the middle sipe is connected to the middle connecting sipe.

5. The heavy duty pneumatic tire according to claim 4, wherein the axially inner end of the middle axial groove has, in its top view, a circumferentially extending central part and a rounded part on each side of the central part in the tire circumferential direction.

6. The heavy duty pneumatic tire according to claim 5, wherein the rounded part has a radius of curvature which is not less than 0.5 mm and not more than 50% of the width of the middle axial groove.

* * * * *